(12) United States Patent
Wada et al.

(10) Patent No.: US 10,902,182 B2
(45) Date of Patent: Jan. 26, 2021

(54) CHANGING THE HEIGHT OF A FACSIMILE SOURCE AREA IN ACCORDANCE WITH A REGISTERED LANGUAGE

(71) Applicant: FUJI XEROX CO., LTD., Tokyo (JP)

(72) Inventors: Manabu Wada, Kanagawa (JP);
Satoshi Watanabe, Kanagawa (JP);
Hirotaka Kawabata, Kanagawa (JP);
Hideki Soejima, Kanagawa (JP);
Hideki Fujii, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/553,165

(22) Filed: Aug. 27, 2019

(65) Prior Publication Data

US 2020/0302000 A1    Sep. 24, 2020

(30) Foreign Application Priority Data

Mar. 22, 2019    (JP) .................................. 2019-055345

(51) Int. Cl.
*G06F 40/109*    (2020.01)
*H04N 1/00*    (2006.01)

(52) U.S. Cl.
CPC ....... *G06F 40/109* (2020.01); *H04N 1/00498* (2013.01); *H04N 1/00503* (2013.01); *H04N 1/00506* (2013.01)

(58) Field of Classification Search
CPC .......... H04N 1/00503; H04N 1/00498; H04N 1/00506; G06F 40/109
See application file for complete search history.

(56) References Cited

U.S. PATENT DOCUMENTS

| 5,497,319 A * | 3/1996 | Chong | G06F 40/55 704/2 |
| 2013/0016372 A1* | 1/2013 | Shibano | G06F 40/103 358/1.9 |
| 2017/0212889 A1* | 7/2017 | Shinohara | G06F 40/109 |

FOREIGN PATENT DOCUMENTS

JP    H08-204862    8/1996

* cited by examiner

*Primary Examiner* — Asher D Kells
(74) *Attorney, Agent, or Firm* — JCIPRNET

(57) ABSTRACT

An information processing apparatus includes a transmission unit that performs facsimile transmission to a destination and a changing unit that changes, in accordance with a language registered in the information processing apparatus, size of a certain area, in which characters including source characters for identifying a facsimile source are to be formed, of a sheet output at the destination as a result of the facsimile transmission in a height direction of the characters.

19 Claims, 12 Drawing Sheets

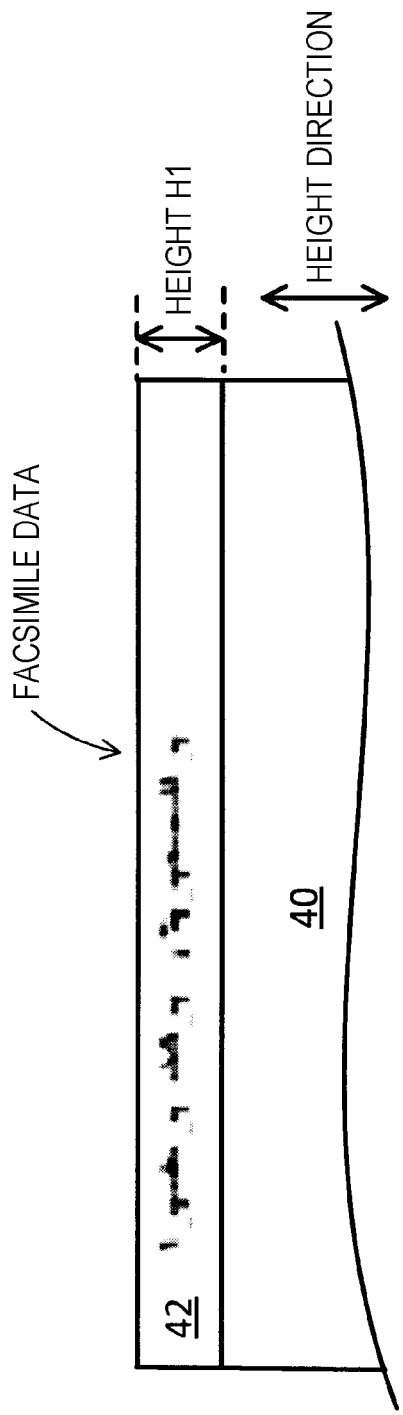

CHANGING THE HEIGHT OF A FACSIMILE SOURCE AREA IN ACCORDANCE WITH A REGISTERED LANGUAGE

CROSS-REFERENCE TO RELATED APPLICATIONS

This application is based on and claims priority under 35 USC 119 from Japanese Patent Application No. 2019-055345 filed Mar. 22, 2019.

BACKGROUND

(i) Technical Field

The present disclosure relates to an information processing apparatus and a non-transitory computer readable medium.

(ii) Related Art

When facsimile transmission is performed, characters for identifying a facsimile source and the like are generally formed in a certain area of image data to be transmitted to a destination of the facsimile transmission. The characters are then formed in a certain area of a sheet output at the destination.

Japanese Unexamined Patent Application Publication No. 8-204862 describes a facsimile apparatus that selectively uses display font data and print font data in accordance with communication resolution when creating a communication header.

SUMMARY

When the size of a certain area in which characters including source characters for identifying a facsimile source are to be formed remains the same regardless of a language of the characters, not all the characters might not be shown in the certain area depending on the language used. As a result, readability of the characters decreases at a destination.

Aspects of non-limiting embodiments of the present disclosure relate to improvement, on a sheet output at a destination of facsimile transmission, of readability of characters including source characters for identifying a facsimile source regardless of a language of the characters, compared to when the size of a certain area in which the characters are to be formed remains the same.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a transmission unit that performs facsimile transmission to a destination and a changing unit that changes, in accordance with a language registered in the information processing apparatus, size of a certain area, in which characters including source characters for identifying a facsimile source are to be formed, of a sheet output at the destination as a result of the facsimile transmission in a height direction of the characters.

BRIEF DESCRIPTION OF THE DRAWINGS

An exemplary embodiment of the present disclosure will be described in detail based on the following figures, wherein:

FIG. 17 is a diagram illustrating the structure of facsimile data in a comparative example.

DETAILED DESCRIPTION

Figure 1:
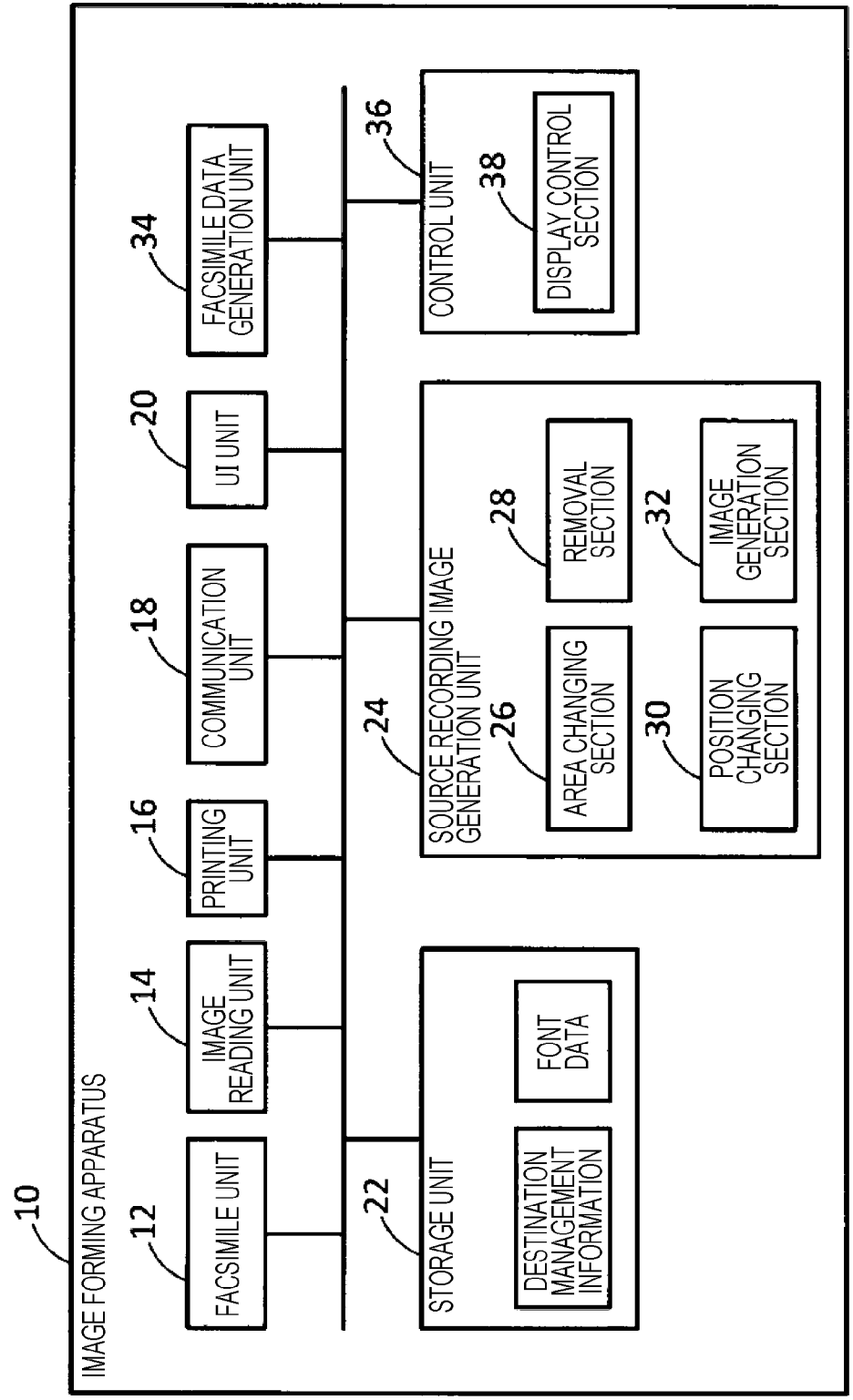
FIG. 1 is a block diagram illustrating the configuration of an image forming apparatus according to an exemplary embodiment.

An image forming apparatus according to an exemplary embodiment will be described hereinafter with reference to FIG. 1. FIG. 1 illustrates an example of the configuration of an image forming apparatus 10 according to the present exemplary embodiment. The image forming apparatus 10 is an example of an information processing apparatus. The image forming apparatus 10 has a facsimile function. The image forming apparatus 10 may be a facsimile apparatus dedicated to facsimile or a multifunction peripheral (MFP) having a function of forming an image in addition to the facsimile function.

A facsimile unit 12 is configured to transmit facsimile data by fax through a communication line in accordance with a facsimile standard. The facsimile unit 12 has, for example, a function of transmitting facsimile data to a destination by fax and a function of receiving facsimile data transmitted from another apparatus, which is referred to as a "source", by fax. As the facsimile standard, for example, Group 3 (G3), Group 4 (G4), Internet protocol (IP) faxing, Internet fax, or the like may be used. It is needless to say another standard may be used, instead.

Facsimile data includes transmission target image data, which is subjected to facsimile transmission, and source recording image data. The transmission target image data and the source recording image data are image data such as bitmap data. The transmission target image data is, for example, image data generated as a result of reading performed by an image reading unit 14, which will be described later. The transmission target image data may be image data transmitted to the image forming apparatus 10 from another apparatus, instead. The source recording image data is image data transmitted to a destination by fax along with the transmission target image data.

The image reading unit 14 is a scanner or a camera, for example, and configured to generate image data representing a document by reading the document. For example, the image reading unit 14 reads a document to be subjected to facsimile transmission to generate image data representing the document. The image data is included in facsimile data as transmission target image data.

A printing unit 16 is an example of an image forming unit and configured to print, on a recording medium such as a sheet of paper, an image based on image data to be printed. Printing of an image on a sheet is an example of forming of an image on a sheet. Printing of an image of characters on a sheet is an example of forming of characters on a sheet. The printing unit 16 is, for example, a printer. If the facsimile unit 12 receives facsimile data by fax, for example, the printing unit 16 prints an image based on the facsimile data on a sheet. As a result, a transmission target image based on transmission target image data and a source recording image based on source recording image data are printed on a sheet.

A communication unit 18 is a communication interface and has a function of transmitting information to another apparatus and a function of receiving information from another apparatus. The communication unit 18 may have a wireless communication function such as Wi-Fi (registered trademark) and/or a wired communication function. The communication unit 18 may communicate with another apparatus through a network such as a local area network (LAN) or a communication path such as the Internet or using short-distance wireless communication such as Bluetooth (registered trademark).

A user interface (UI) unit 20 includes a display section and an operation section. The display section is a display device such as a liquid crystal display. The operation section is an input device such as a keyboard, input keys, or an operation panel. The UI unit 20 may be a touch panel that serves as both the display section and the operation section.

A UI screen in a display language set for the image forming apparatus 10, for example, is displayed on the display section of the UI unit 20. The UI screen enables a user to operate the image forming apparatus 10. For example, the user can request facsimile transmission, select a destination, register a destination, or the like on the UI screen. If the display language is set to Japanese, a Japanese UI screen is displayed, and if the display language is set to English, an English UI screen is displayed. Japanese characters are displayed on the Japanese UI screen, and English characters are displayed on the English UI screen. The display language is preset, for example, in the image forming apparatus 10. In this case, a UI screen is displayed in the preset display language. The user may change the display language set for the image forming apparatus 10. A plurality of display languages are registered in the image forming apparatus 10, for example, and a display language selected by the user from the plurality of display languages is set for the image forming apparatus 10. A UI screen in the display language selected by the user is then displayed.

A storage unit 22 includes one or a plurality of storage areas storing various pieces of information. The storage areas are each achieved by one or a plurality of storage devices (e.g., physical drives such as hard disk drives or memories), for example, provided for the image forming apparatus 10. The storage unit 22 stores, for example, facsimile data to be subjected to facsimile transmission, facsimile data received by fax, and the like. The storage unit 22 also stores display language identification information for identifying a display language set for the image forming apparatus 10.

The storage unit 22 also stores destination management information. The destination management information is information for managing destination telephone numbers and the like. Data usually referred to as an "address book" or the like is an example of the destination management information. In the destination management information, for example, destination name information indicating a destination name and telephone number information indicating a destination telephone number are associated with each other for each destination. Various pieces of information included in the destination management information may be registered by the user to the destination management information or may be input to the image forming apparatus 10 from another apparatus and registered to the destination management information. The destination name information indicates, for example, a name, a style, an abbreviation, a nickname, or the like of a destination. It is needless to say another type of information may be registered by the user as the destination name information. The user may select a destination registered in the destination management information as a facsimile destination.

The storage unit 22 also stores font data. Combinations of a character code and information regarding a type of font and glyph data that represents a shape of the character indicated by the character code with the corresponding font are associated with each other, for example, and stored in the storage unit 22 as font data. As the glyph data, outline font data or bitmap font data, for example, is used. Outline font data, for example, is used as glyph data for representing characters to be displayed on the display section of the UI unit 20. That is, outline font data is used as glyph data to be displayed on the UI screen. In addition, bitmap font data is used as glyph data for representing characters indicated by source recording image data. Alternatively, outline font data may be used as the glyph data for representing characters indicated by source recording image data.

A source recording image generation unit 24 is configured to generate source recording image data to be included in facsimile data.

Source recording image data will be described in detail hereinafter. Source recording image data indicates source recording information. The source recording information includes source identification information for identifying a facsimile source. The source recording information is represented by characters. The characters are symbols having character codes and may be, for example, symbols indicating a language or symbols indicating pictures or figures. Special characters may also be included in the characters. A standard for character codes used is not particularly limited. For example, header information is an example of the source recording information. Header information is usually printed in an area at an upper end of a sheet.

In the following description, characters indicating source recording information will be referred to as "source recording characters", and characters indicating source identification information will be referred to as "source characters". Source recording characters include source characters. Source recording image data indicates source recording characters including source characters for identifying a facsimile source.

A facsimile source is a user associated with the image forming apparatus 10 as a person who has transmitted facsimile data. A facsimile source may be an individual user or an organization such as a company. For example, source identification information is stored in the storage unit 22 in advance. The source identification information indicates, for example, a name, a style, an abbreviation, a nickname, or the like of a facsimile source. It is needless to say another type of information may be registered by the user as the source identification information.

The source recording information may further include information for identifying a destination, time information indicating a time of facsimile transmission, information indicating a number of a document, and information indicating a page number. Information to be included in the source recording information may be selected by the user in advance or at a time of facsimile transmission, or may be preset.

The source recording image data is printed, for example, in a source recording area of a recording medium, such as a sheet of paper, output at a facsimile destination. The source recording area of the recording medium is, for example, an area at an upper end of a sheet. A header, for example, is an example of the source recording area of a sheet. In another example, the source recording area may be an area at a lower end of a sheet. The source recording area of a sheet is an example of a certain area.

The source recording image generation unit 24 will be described in detail hereinafter. The source recording image generation unit 24 includes an area changing section 26, a removal section 28, a position changing section 30, and an image generation section 32.

The area changing section 26 is configured to change the size of a source recording area, in which a source recording image based on source recording image data is to be printed, of a sheet output at a destination as a result of facsimile transmission in a height direction of source recording characters in accordance with a language registered in the image forming apparatus 10. That is, the area changing section 26 is configured to change the size of an area of facsimile data occupied by a source recording image in a height direction of source recording characters. An area of facsimile data occupied by a source recording image will be referred to as a "source recording image area" hereinafter. An area of facsimile data occupied by a transmission target image based on transmission target image data will be referred to as a "transmission target image area". The area changing section 26 is an example of a changing unit.

The language registered in the image forming apparatus 10 may be a language set for the image forming apparatus 10 as a display language or a language of characters set as source characters. In either case, the language has been registered by the user to the image forming apparatus 10.

For example, the area changing section 26 may change the size of a source recording area in a height direction of source recording characters in accordance with a display language set for the image forming apparatus 10. That is, the area changing section 26 may change the size of a source recording image area in a height direction of source recording characters in accordance with the display language.

In another example, the area changing section 26 may change the size of a source recording area in a height direction of source recording characters in accordance with a language of the source recording characters. That is, the area changing section 26 may change the size of a source recording image area in a height direction of source recording characters in accordance with the language.

The area changing section 26 may change the size of a source recording area in a height direction of source recording characters in accordance with a language of a source recording character that requires a greatest height. That is, the area changing section 26 may change the size of a source recording image area in a height direction of source recording characters in accordance with the language.

The removal section 28 is configured to remove a part of each source recording character irrelevant to identification of a meaning of the character. The area changing section 26 changes the size of a source recording area in a height direction of source recording characters in accordance with the size of the source recording characters from which unnecessary parts have been removed.

Tashkil in Arabic, for example, are phonetic symbols without meanings and might be added to characters having meanings. If Arabic characters with tashkil are included in source recording characters, the removal section 28 removes the tashkil from the characters.

The position changing section 30 is configured to change a position on a sheet at which an image transmitted to a destination through facsimile transmission is to be formed, that is, a position at which an image (i.e., a transmission target image) other than a source recording image is to be printed, in a height direction of source recording characters in accordance with the size of the source recording image area. That is, the position changing section 30 is configured to change a position of transmission target image data included in facsimile data in a height direction of characters in accordance with the size of a source recording image area.

The image generation section 32 is configured to generate source recording image data. More specifically, the image generation section 32 obtains, from the storage unit 22 for each of source recording characters, which indicate source recording information, glyph data associated with a combination of a character code indicating the character and a type of font used to represent the character. The image generation section 32 then generates source recording image data indicating the source recording characters using the glyph data regarding the source recording characters.

A facsimile data generation unit 34 generates facsimile data by combining together transmission target image data to be subjected to facsimile transmission and source recording image data generated by the source recording image generation unit 24.

A control unit 36 is configured to control the other components of the image forming apparatus 10. The control unit 36 includes a display control section 38.

The display control section 38 is configured to display various pieces of information on the display section of the UI unit 20. The display control section 38 displays characters on the display section in accordance with the display language set for the image forming apparatus 10. For example, the display control section 38 displays, on the display section, a UI screen in the display language set for the image forming apparatus 10.

A facsimile destination apparatus includes, for example, the facsimile unit 12, the image reading unit 14, the printing unit 16, the UI unit 20, a storage unit, and a control unit. The facsimile destination apparatus may have the same configuration as the image forming apparatus 10. The facsimile unit 12 of the facsimile destination apparatus receives facsimile data transmitted by fax from the image forming apparatus 10, which is a facsimile source, and the printing unit 16 prints images (i.e., a transmission target image and a source recording image) based on the facsimile data on a sheet.

A specific example of the image forming apparatus 10 will be described in detail hereinafter.

Figure 2:
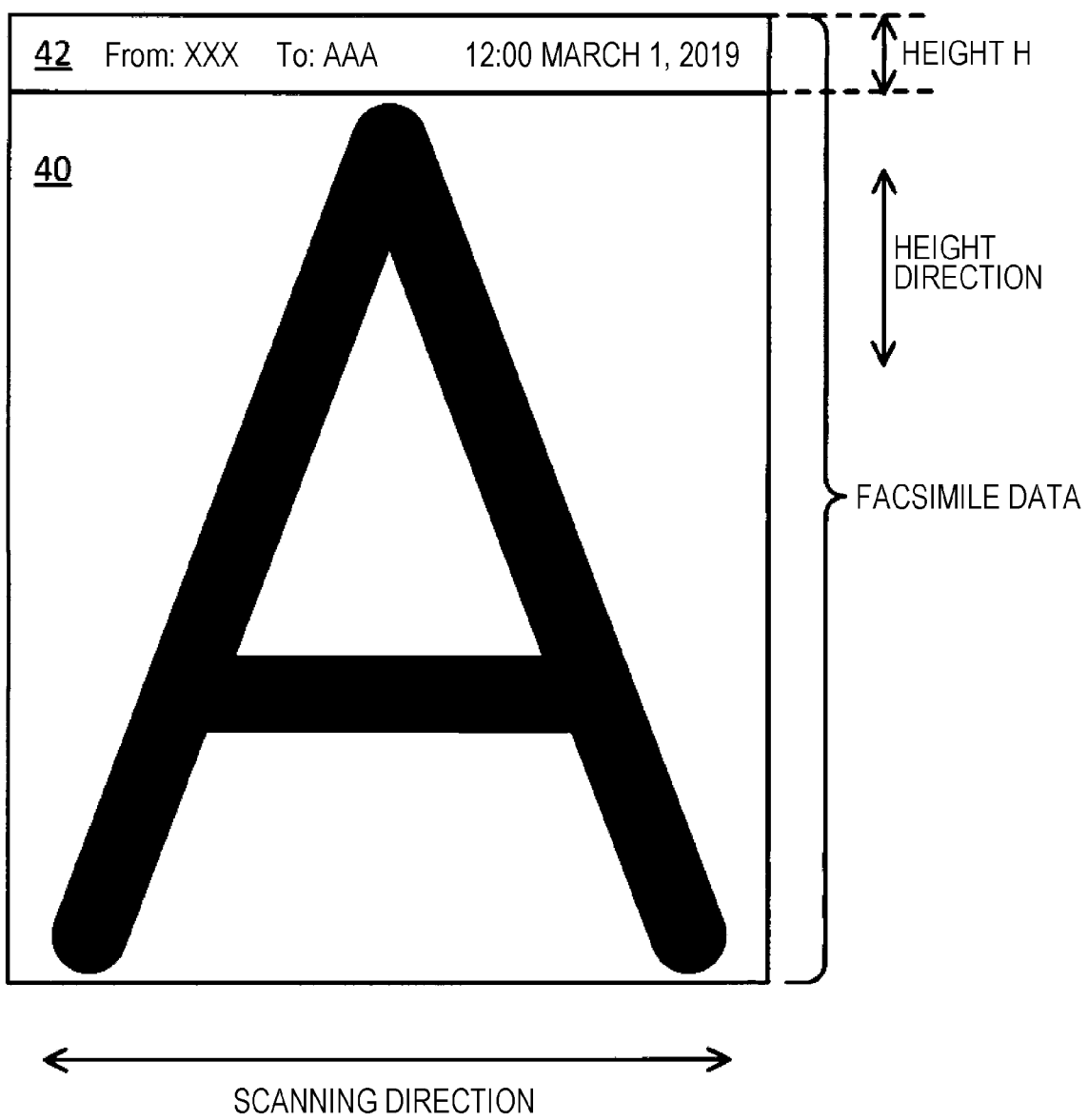
FIG. 2 is a diagram illustrating the structure of facsimile data.

The structure of facsimile data will be described in detail with reference to FIG. 2. FIG. 2 illustrates an example of the structure of facsimile data.

Facsimile data includes transmission target image data and source recording image data. A transmission target image area 40 of the facsimile data is occupied by the transmission target image. A source recording image area 42 of the facsimile data is occupied by the source recording image data. The transmission target image area 40 shows a transmission target image, and the source recording image area 42 shows the source recording image. The source recording image area 42 is, for example, an area at an upper end of a sheet printed at a destination. The source recording image area 42 may be an area at a lower end of a sheet, instead. The source recording image area 42 may or may not overlap the transmission target image area 40. That is, the source recording image may or may not overlap the transmission target image.

The source recording image includes, for example, source characters for identifying a facsimile source (e.g., characters "XXX"), characters for identifying a destination (e.g., characters "AAA"), and characters indicating a transmission time (e.g., "12:00 Mar. 1, 2019"). The source recording image illustrated in FIG. 2 is just an example, and a source recording image may include characters indicating other pieces of information (e.g., telephone numbers of a facsimile source and a facsimile destination), instead.

The source recording image area 42 has a height H. The height H refers to length in a height direction of characters included in the source recording image. The height H is set, for example, for the image forming apparatus 10 in advance. The area changing section 26 changes the height H of the source recording image area 42 in accordance with the language set for the image forming apparatus 10. The user may change the height H.

The height direction of characters corresponds to a conveying direction (i.e., a sub-scanning direction) of a sheet printed at a destination. A direction perpendicular to the height direction of characters corresponds to a scanning direction during printing.

Figure 3:
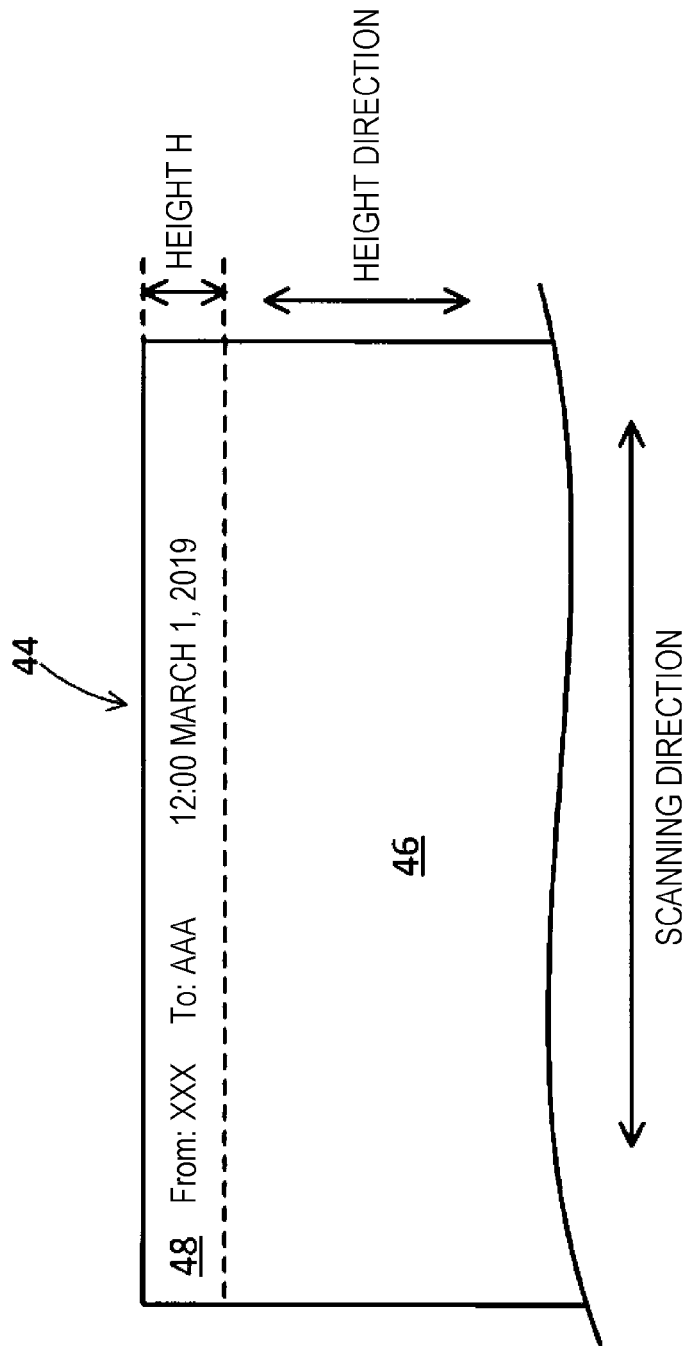
FIG. 3 is a diagram illustrating a sheet.

A sheet output at a facsimile destination will be described in detail with reference to FIG. 3. FIG. 3 illustrates a part of a sheet 44.

An area 46 of the sheet 44 corresponds to the transmission target image area 40 of facsimile data. A transmission target image based on transmission target image data included in facsimile data is printed in the area 46 of the sheet 44. For example, a transmission target image shown in the transmission target image area 40 illustrated in FIG. 2 is printed in the area 46 of the sheet 44.

A source recording area 48 of the sheet 44 corresponds to the source recording image area 42 of facsimile data. A source recording image based on source recording image data included in facsimile data is printed in the source recording area 48 of the sheet 44. The source recording area 48 is, for example, an area at an upper end of the sheet 44. A source recording image indicating information included in source recording information is printed in the source recording area 48 of the sheet 44. For example, a source recording image shown in the source recording image area 42 illustrated in FIG. 2 is printed in the source recording area 48 of the sheet 44. In the example illustrated in FIG. 3, the source characters for identifying a facsimile source (e.g., the characters "XXX"), the characters for identifying a destination (e.g., the characters "AAA"), and the characters indicating a transmission time (e.g., "12:00 Mar. 1, 2019") are printed in the source recording area 48.

The source recording area 48 may or may not overlap the area 46 on the sheet 44. That is, the source recording image may or may not overlap the transmission target image on the sheet 44.

The source recording area 48 of the sheet 44 has the height H as with the corresponding source recording image area 42. If the height H of the source recording image area 42 is changed, the height H of the source recording area 48 accordingly changes. A height direction of characters on the sheet 44 corresponds to a conveying direction (i.e., a sub-scanning direction) of the sheet 44, and a direction perpendicular to the height direction of the characters corresponds to a scanning direction during printing.

The facsimile data generation unit 34 combines transmission target image data and source recording image data together such that the source recording image is printed in the source recording area 48. For example, the facsimile data generation unit 34 combines the source recording image data at a top of the transmission target image data.

Although the area 46 and the source recording area 48 do not overlap in the example illustrated in FIG. 3, the entirety or a part of the source recording area 48 may overlap the area 46, instead. In this case, the entirety or a part of the source recording image is printed on the transmission target image.

The position of the source recording area 48 is just an example, and an area at a lower end or a left or right side of the sheet 44 may be used as a source recording area, instead. In this case, the facsimile data generation unit 34 combines the source recording mage data with the transmission target image data such that the source recording image is printed in the source recording area.

Figure 4:
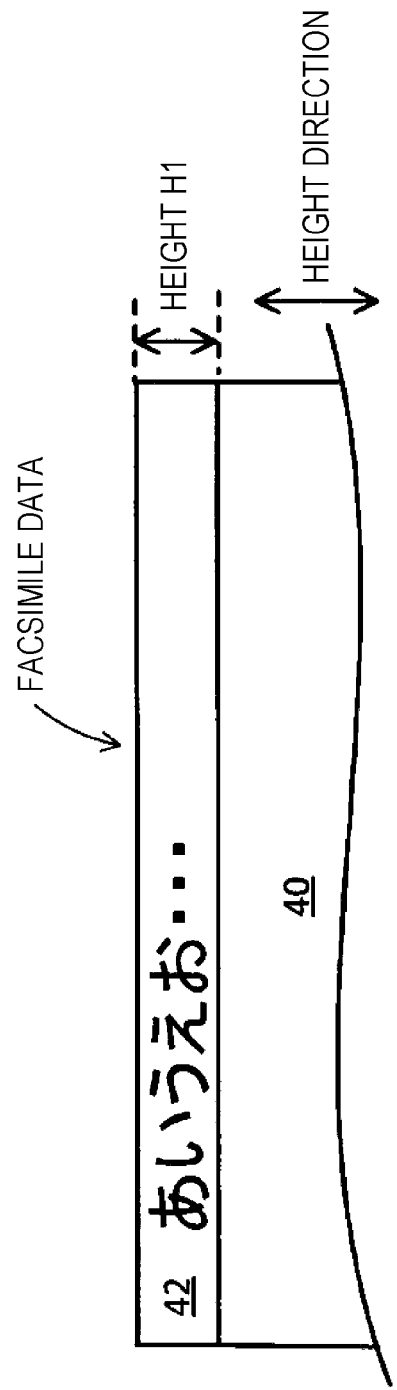
FIG. 4 is a diagram illustrating the structure of facsimile data.
Figure 5:
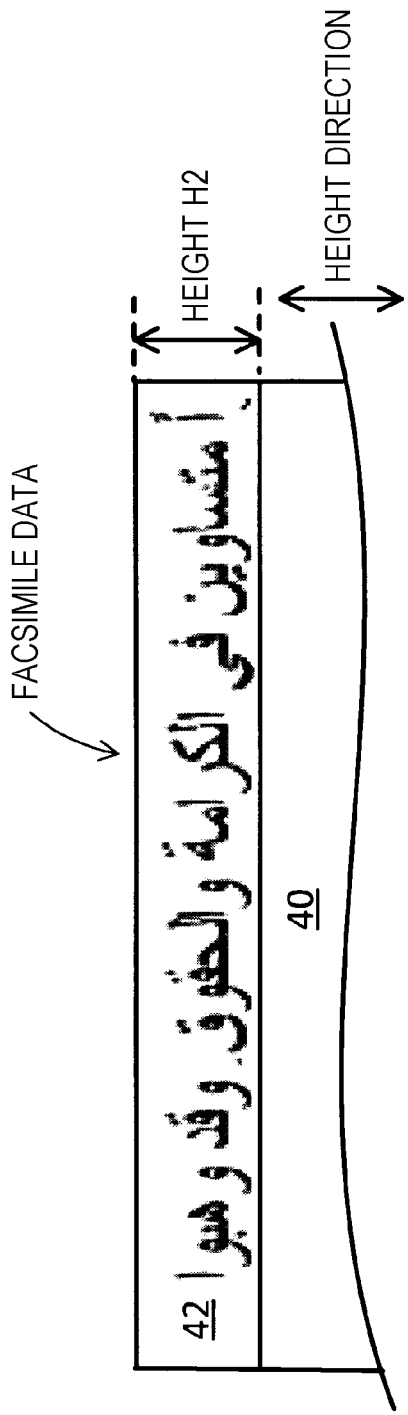
FIG. 5 is a diagram illustrating the structure of facsimile data.
Figure 6:
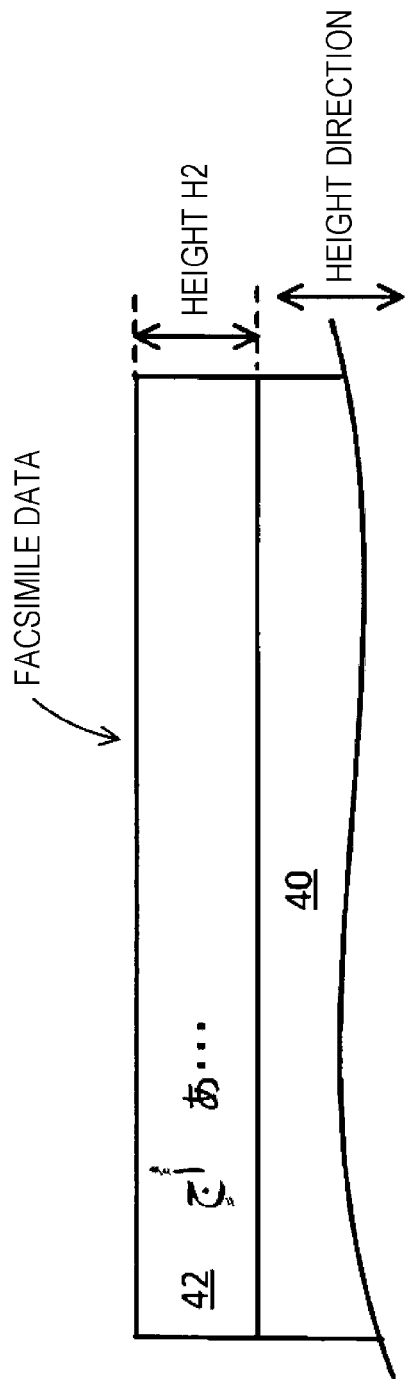
FIG. 6 is a diagram illustrating the structure of facsimile data.

A specific example of a process performed by the image forming apparatus 10 will be described in detail hereinafter with reference to FIGS. 4 to 6. FIGS. 4 to 6 illustrate the structure of a part of facsimile data.

A minimum required size of characters for users to recognize the characters differs depending on the language. It is assumed, for example, that a minimum required number of dots for representing Arabic characters recognizable by users is 24, a minimum required number of dots for representing Thai characters is 20, and a minimum required number of dots for representing characters in other languages (e.g., Japanese) is 16. That is, in order to represent Arabic characters, a minimum of 24 dots are required in a height direction of the characters and a minimum of 24 dots are required in a lateral direction (a direction perpendicular to the height direction) of each character. In order to represent Thai characters, a minimum of 20 dots are required in a height direction of the characters and a minimum of 20 dots are required in a lateral direction of each character. In order to represent characters in other languages (e.g., Japanese), a minimum of 16 dots are required in a height direction of the characters and a minimum of 16 dots are required in a lateral direction of each character. The number of dots mentioned above is a minimum required number of dots for representing characters in each language, and some characters can be represented with fewer dots even in the same language. 24 dots are required in order to represent some Arabic characters, but fewer dots are required in order to represent other Arabic characters. The same holds for other languages. The number of dots mentioned above is just an example, and the number of dots required might be different depending on a type of font used. Although the minimum required number of dots in a height direction and the minimum required number of dots in a lateral direction are the same in the above description, the minimum required number of dots in a height direction and the minimum required number of dots in a lateral direction may be different from each other, instead.

The area changing section 26 changes the height H of the source recording image area 42 of facsimile data in accordance with a language of source recording characters indicating source recording information. For example, the area changing section 26 sets the height H of the source recording image area 42 equal to or larger than a height required by a language of source recording characters.

If the language of the source recording characters is Arabic, that is, if the source recording characters each have an Arabic character code, for example, the area changing section 26 sets the height H of the source recording image area 42 to a value according to Arabic. More specifically, the area changing section 26 sets the number of dots of the height H of the source recording image area 42 to 24. As a result, the height H of the source recording image area 42 becomes 24 dots. Alternatively, the area changing section 26 may set the number of dots of the height H of the source recording image area 42 to a value larger than 24.

Similarly, if the language of the source recording characters is Thai, that is, if the source recording characters each have a Thai character code, the area changing section 26 sets the number of dots of the height H of the source recording image area 42 to 20. As a result, the height H of the source recording image area 42 becomes 20 dots. Alternatively, the area changing section 26 may set the number of dots of the height H of the source recording image area 42 to a value larger than 20.

Similarly, if the language of the source recording characters is Japanese, that is, if the source recording characters each have a Japanese character code, the area changing section 26 sets the number of dots of the height H of the source recording image area 42 to 16. As a result, the height H of the source recording image area 42 becomes 16 dots. Alternatively, the area changing section 26 may set the number of dots of the height H of the source recording image area 42 to a value larger than 16.

The area changing section 26 may change the height H of the source recording image area 42 in accordance with a language of a source recording character that requires a greatest height. Arabic, for example, is a language that requires a greatest height. If the source recording characters include a character having an Arabic character code, the area changing section 26 changes the height H of the source recording image area 42 to a value according to Arabic. That is, the area changing section 26 sets the number of dots of the height H of the source recording image area 42 to 24. If the source recording characters include characters in different languages, for example, the area changing section 26 sets the height H of the source recording image area 42 to a value according to a language that requires a greatest height.

If the source recording characters include only Japanese characters, for example, the area changing section 26 sets the height H of the source recording image area 42 to a height H1 as illustrated in FIG. 4. The height H1 is 16 dots. Source recording image data indicating the Japanese characters is disposed in the source recording image area 42 having the height H1. Each of the characters indicated by the source recording image data extends over a maximum of 16 dots in the height direction and the lateral direction (16 dots×16 dots in size).

If the facsimile data illustrated in FIG. 4 is printed on the sheet 44, a source recording image based on the source recording image data disposed in the source recording image area 42 is printed in the source recording area 48 of the sheet 44 having the height H1. That is, the source recording characters including only Japanese characters are printed in the source recording area 48. In this case, the characters having a maximum of 16 dots in the height direction and the lateral direction are printed.

If the source recording characters include only Arabic characters, the area changing section 26 sets the height H of the source recording image area 42 to a height H2 as illustrated in FIG. 5. The height H2 is 24 dots. Source recording image data indicating the Arabic characters is disposed in the source recording image area 42 having the height H2. Each of the characters indicated by the source recording image data extends over a maximum of 24 dots in the height direction and the lateral direction (24 dots×24 dots in size).

If the facsimile data illustrated in FIG. 5 is printed on the sheet 44, a source recording image based on the source recording image data disposed in the source recording image area 42 is printed in the source recording area 48 of the sheet 44 having the height H2. That is, the source recording characters including only Arabic characters are printed in the source recording area 48. In this case, the characters having a maximum of 24 dots in the height direction and the lateral direction are printed.

If the source recording characters include both Arabic characters and Japanese characters, the area changing section 26 sets the height H of the source recording image area 42 to the height H2 according to the Arabic characters, which require a greatest height, as illustrated in FIG. 6. Source recording image data indicating the Arabic characters and the Japanese characters is disposed in the source recording image area 42 having the height H2. Each of the Arabic characters indicated by the source recording image data extends over a maximum of 24 dots in the height direction and the lateral direction. Each of the Japanese characters indicated by the source recording image data extends over a maximum of 16 dots in the height direction and the lateral direction.

If the source recording characters include characters whose language requires a height smaller than the height H of the source recording image area 42, the area changing section 26 does not change the size of the characters to a size according to the height H of the source recording image area 42. In an example illustrated in FIG. 6, the area changing section 26 does not change the size of each Japanese character to 24 dots, which corresponds to the height H2. If characters in a language that does not require a greatest height are extended in the height direction and the lateral direction, not all the source recording characters might be shown in the source recording image area 42, and some of the source recording characters might not be printed in the source recording area 48 of the sheet 44. When the size of characters in a language that does not require a greatest height is not changed, all the source recording characters can be certainly printed. Characters that do not require a greatest height may be disposed in the source recording image area 42 at, above, or below the center in the height direction.

If the facsimile data illustrated in FIG. 6 is printed on the sheet 44, a source recording image based on the source recording image data disposed in the source recording image area 42 is printed in the source recording area 48 of the sheet 44 having the height H2. That is, the source recording characters including the Arabic characters and the Japanese characters are printed in the source recording area 48. In this case, the Arabic characters are printed in a size of a maximum of 24 dots in the height direction and the lateral direction, and the Japanese characters are printed in a size of a maximum of 16 dots in the height direction and the lateral direction. Characters in each language are thus printed in a size according to the language.

As described above, the source recording image generation unit 24 generates source recording image data indicating source recording characters such that each of the source recording characters is printed in the source recording area 48 in a size according to a language of the source recording character. As a result, each of the source recording characters is printed in the source recording area 48 in a size according to a language of the source recording character at a destination apparatus (e.g., a facsimile apparatus or an image forming apparatus 10).

In another example, the area changing section 26 may change the height H of the source recording image area 42 in accordance with the display language set for the image forming apparatus 10. If Japanese is set as the display language, for example, the area changing section 26 sets the height H of the source recording image area 42 to the height H1 according to Japanese. If Arabic is set as the display language, the area changing section 26 sets the height H of the source recording image area 42 to the height H2 according to Arabic. If a predetermined display language is set for the image forming apparatus 10 and the user changes the display language set for the image forming apparatus 10, for example, the area changing section 26 changes the height H of the source recording image area 42 in accordance with the new display language.

The display control section 38 may display a recommended value of the height H of the source recording image area 42 on the display section of the UI unit 20. If the user registers source recording information to the image forming apparatus 10, for example, the display control section 38 displays a recommended value on the display section in accordance with a language of source recording characters indicating the source recording information. If the height H of the source recording image area 42 is smaller than a height required by a language of the source recording characters, the display control section 38 displays the recommended value of the height H for the language on the display section. If the height H of the source recording image area 42 is smaller than a height required by the language of the source recording characters, the display control section 38 also displays a message for asking the user to give an instruction to change the height H.

Figure 7:
FIG. 7 is a diagram illustrating a screen for displaying a recommended value.

For example, the height H of the source recording image area 42 is set to a default height H0. The number of dots of the default height H0 is 16. If the source recording characters include Arabic characters in this case, the display control section 38 displays, on the display section, information indicating that the recommended value of the height H is 24 dots, since the height H0 of the source recording image area 42 is smaller than the height H2 required for Arabic. FIG. 7 illustrates a screen in which the recommended value is displayed. The screen is displayed on the display section of the UI unit 20. If the user gives an instruction to change the height H using the UI unit 20 (e.g., if the user presses an "OK" button on the screen), the area changing section 26 changes the number of dots of the height H of the source recording image area 42 to 24 dots, which is the recommended value, from 16 dots, which is the default height. If the user refuses to change the height H (e.g., if the user presses a "cancel" button on the screen), the area changing section 26 does not change the height H of the source recording image area 42. In this case, the number of dots of the height H remains 16 dots.

If the source recording characters include only Japanese characters, on the other hand, the display control section 38 does not display the recommended value on the display section, since the height H0 of the source recording image area 42 is the same as the height H1 required for Japanese. The recommended value may be displayed when the user has registered source recording information to the image forming apparatus 10. The user may change the height H, for example, when the user has registered source characters or when the user has registered characters for identifying a destination.

The display control section 38 displays the recommended value on the display section when the user has selected a destination from destination management information. The destination management information is displayed on the display section of the UI unit 20, and the display control section 38 displays the recommended value on the display section when the user has selected a destination from the displayed destination management information.

In another example, the display control section 38 may display the recommended value on the display section when the user has given an instruction to perform facsimile transmission. A button for the user to give an instruction to perform facsimile transmission is displayed on the display section of the UI unit 20, for example, and if the user presses the button, the display control section 38 displays the recommended value on the display section. The user then changes or refuses to change the height H after checking the recommended value. The recommended value need not be a specific value and may be a degree such as "large", "medium", or "small", instead. Alternatively, the display control section 38 need not display a recommended value and may display a graphic for asking the user to give an instruction to change the height H (e.g., the above-mentioned "OK" button or an input window for inputting the height H).

A process performed by the removal section 28 will be described in detail hereinafter. If the source recording characters include Arabic characters with tashkil, for example, the removal section 28 removes the tashkil. The area changing section 26 changes the height H of the source recording image area 42 in accordance with the size of the source recording characters from which the tashkil have been removed.

Figure 8:
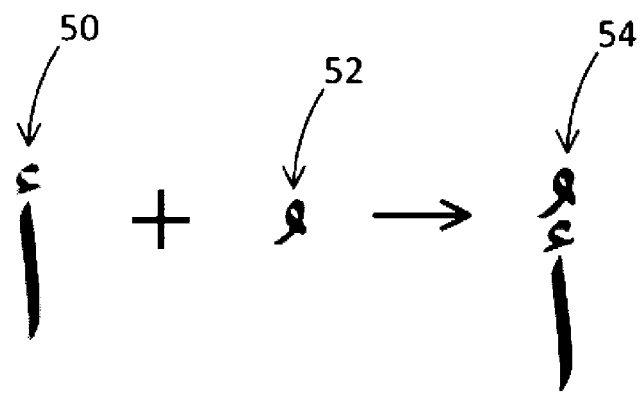
FIG. 8 is a diagram illustrating a character.

Tashkil will be described hereinafter. FIG. 8 illustrates an example of a tashkil added to a top of a character. A symbol 50 has a character code "0623". The symbol 50 is a character having a meaning by itself. A symbol 52 has a character code "064F". The symbol 52 is a tashkil, that is, a phonetic symbol without a meaning. If the symbol 52 is added to a top of the symbol 50 (i.e., above the symbol 50), a symbol 54, which is a character with a tashkil, is formed.

Figure 9:
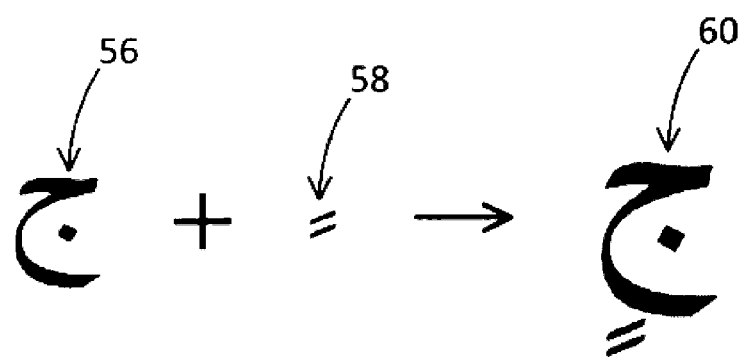
FIG. 9 is a diagram illustrating a character.

FIG. 9 illustrates an example of a tashkil added to a bottom of a character. A symbol 56 has a character code "062C". The symbol 56 has a meaning by itself. A symbol 58 has a character code "064D". The symbol 58 is a tashkil, that is, a phonetic symbol without a meaning. If the symbol 58 is added to a bottom of the symbol 56 (i.e., below the character), a symbol 60, which is a character with a tashkil, is formed.

Figure 10:
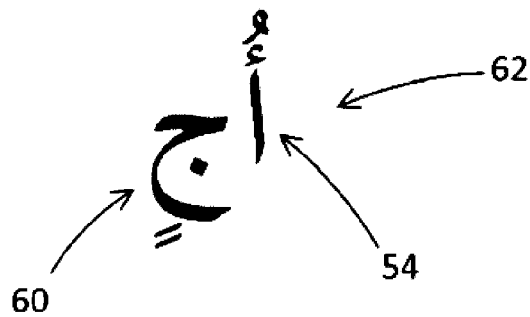
FIG. 10 is a diagram illustrating the characters.

FIG. 10 illustrates characters 62 including the symbols 54 and 60. By arranging the symbols 54 and 60 side by side, the characters 62 are formed.

Figure 11:
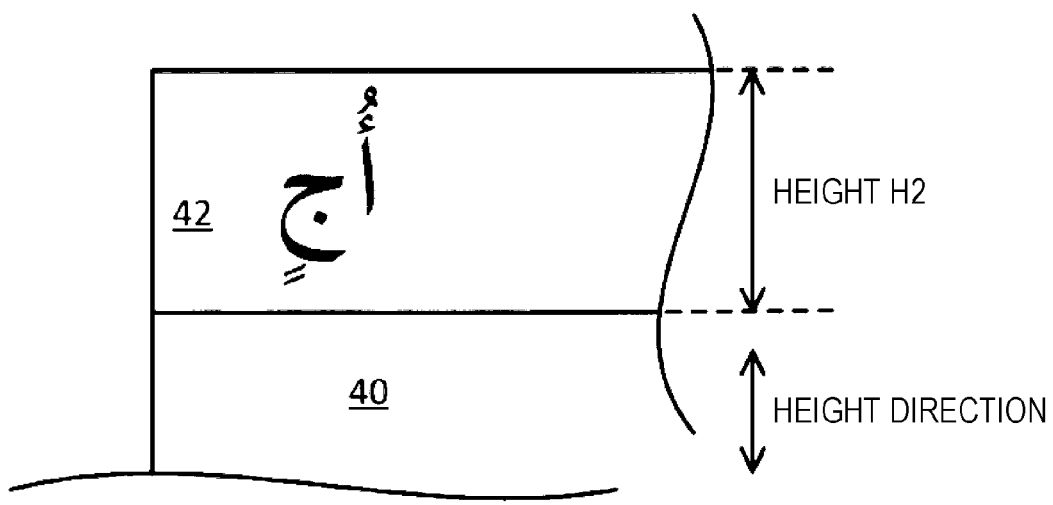
FIG. 11 is a diagram illustrating the structure of facsimile data.

FIG. 11 illustrates the characters 62 shown in the source recording image area 42. The symbol 54 includes a tashkil at the top thereof, and the symbol 60 includes a tashkil at the bottom thereof. The characters 62 therefore require the height H2 as a whole. As illustrated in FIG. 11, the area changing section 26 sets the height H of the source recording image area 42 to the height H2.

Figure 12:
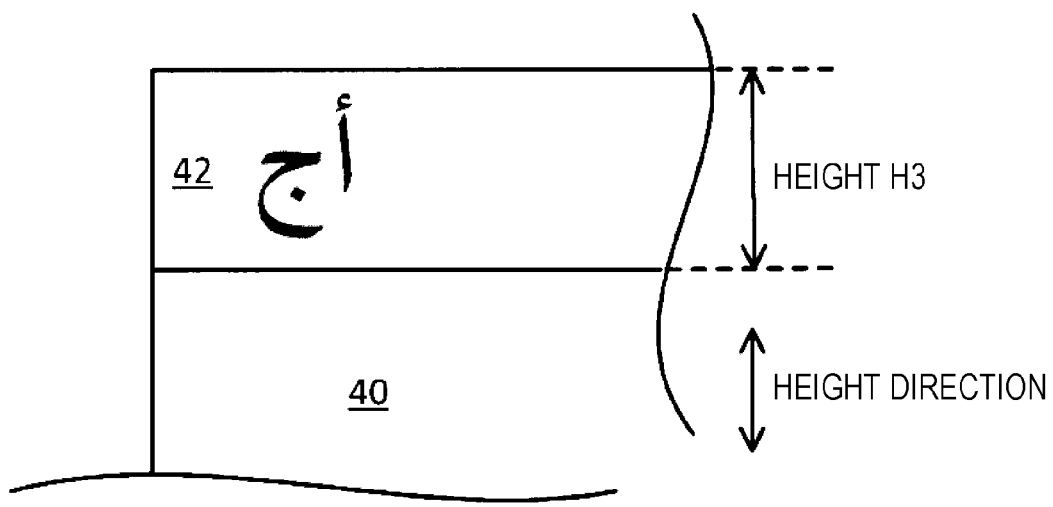
FIG. 12 is a diagram illustrating the structure of the facsimile data.

The removal section 28 removes the tashkil included in the characters 62. More specifically, the removal section 28 removes the symbols 52 and 58 having the character codes indicating tashkil from the characters 62. As illustrated in FIG. 12, the area changing section 26 sets the height H of the source recording image area 42 to a height H3 required by characters from which tashkil have been removed. The height H3 is smaller than the height H2 by the size of tashkil removed. That is, the number of dots corresponding to the height H3 is smaller than that corresponding to the height H2.

By removing symbols without a meaning, the height H of the source recording image area 42 can be reduced compared to when symbols without a meaning are not removed. It is assumed, for example, that a maximum of 24 dots are required in order to represent source recording characters from which symbols without a meaning have not been removed, but a maximum of 20 dots are required in order to source recording characters from which symbols without a meaning have been removed. The height H of the source recording image area 42 is reduced by 4 dots in this case by removing symbols without a meaning. As described later, when symbols without a meaning are removed, transmission target image data might not need to be moved in a height direction of characters.

Figure 13:
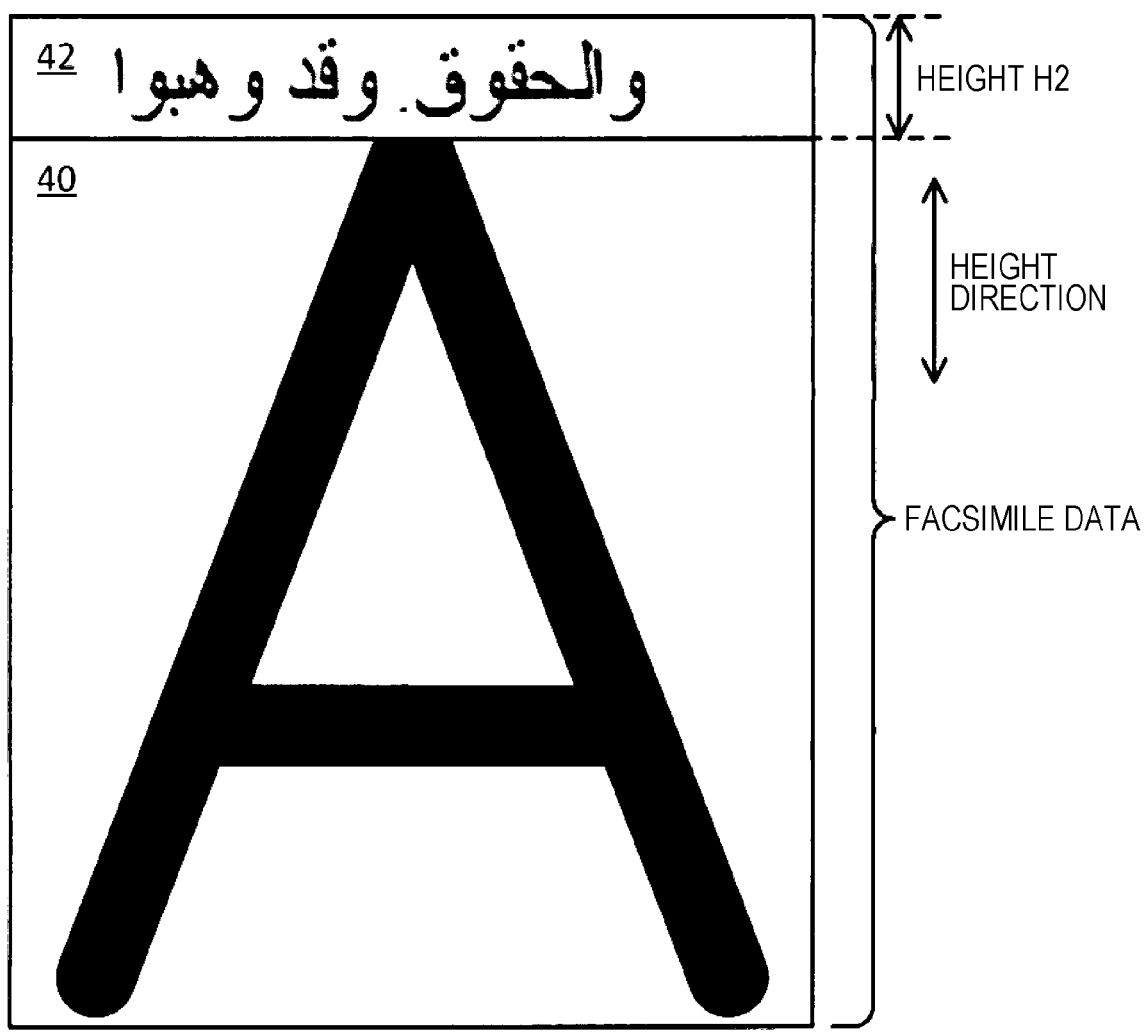
FIG. 13 is a diagram illustrating the structure of facsimile data.
Figure 14:
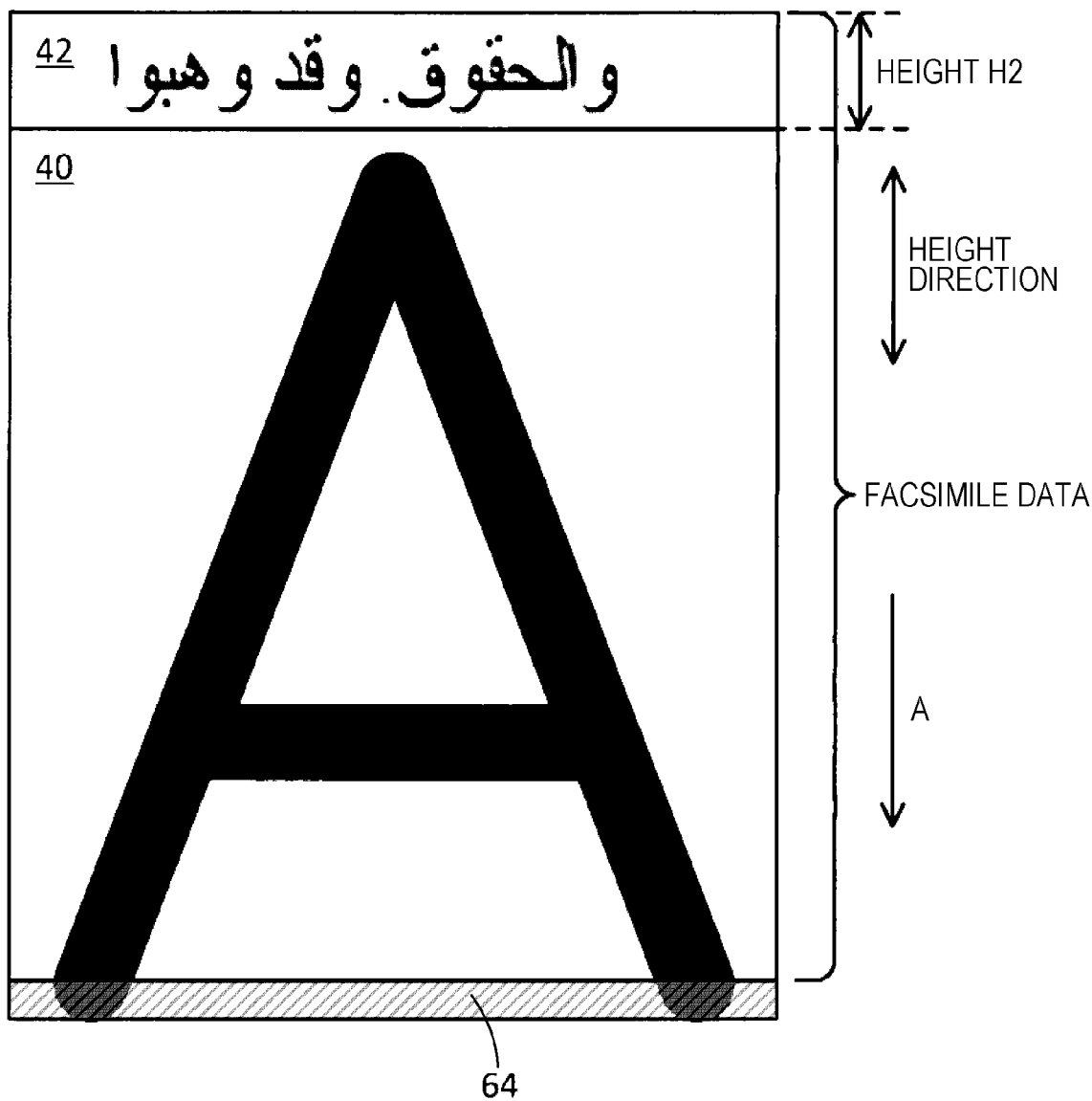
FIG. 14 is a diagram illustrating the structure of the facsimile data.

A process performed by the position changing section 30 will be described in detail hereinafter with reference to FIGS. 13 and 14. FIGS. 13 and 14 illustrate an example of the structure of facsimile data.

In the example illustrated in FIG. 13, the source recording image area 42 overlaps the transmission target image area 40. That is, a source recording image overlaps a transmission target image. When facsimile data illustrated in FIG. 13 is printed on a sheet output at a destination, the source recording image overlaps the transmission target image on the sheet. When a source recording image overlaps a transmission target image as a result of printing, the printing will be referred to as "overlap printing" hereinafter.

In the example illustrated in FIG. 14, the source recording image area 42 does not overlap the transmission target image area 40. It is assumed, for example, that the height H of the source recording image area 42 has been changed from the default height H0 to the height H2, which is greater than the height H0. In this case, the position changing section 30 moves transmission target image data (i.e., the transmission target image area 40) included in the facsimile data in a height direction of characters by the amount of increase in the height H so that the source recording image area 42 does not overlap the transmission target image area 40. For example, the position changing section 30 moves the transmission target image data in a direction indicated by an arrow A (e.g., in a direction of a next page) by a difference ΔH between the height H2 and the height H0. When the facsimile data including the moved transmission target image data is printed on a sheet output at a destination, the transmission target image is moved in the direction indicated by the arrow A. As a result, the source recording image does not overlap the transmission target image. When transmission target image data is moved and printed, the printing will be referred to as "slide printing" hereinafter.

When transmission target image data is moved, an image area extends in the height direction. For example, a part of transmission target image data might be included in an image area 64 of a next page. In this case, a part of a transmission target image is printed on the next page. If the number of dots of the default height H0 is 16 and the number of dots of the height H2 is 24, for example, transmission target image data is moved in a direction of a next page by 8 dots and printed.

The user may select overlap printing or slide printing. The position changing section 30 moves, or does not move, transmission target image data in the height direction in accordance with the selection performed by the user.

Figure 15:
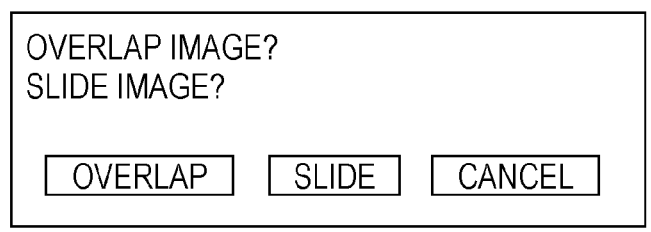
FIG. 15 is a diagram illustrating a screen for selecting overlap printing or slide printing.

If the height H of the source recording image area 42 is changed to a value larger than the default height H0 (e.g., the height H2), for example, the display control section 38 displays a screen for enabling the user to select overlap printing or slide printing on the display section of the UI unit 20 as illustrated in FIG. 15. If the user gives an instruction to perform overlap printing on the screen (e.g., if the user presses an "overlap" button), the position changing section 30 does not move transmission target image data in the height direction. A source recording image overlaps a transmission target image at a destination. If the user gives an instruction to perform slide printing on the screen (e.g., if the user presses a "slide" button), the position changing section 30 moves the transmission target image data in the height direction by the difference ΔH between a new height (height H2) and the height H0. The source recording image does not overlap the transmission target image at the destination.

The default height H0 is set, for example, on the basis of the display language set for the image forming apparatus 10. If the source recording characters include characters in a language that requires a height greater than the default height H0, the area changing section 26 changes the height H of the source recording image area 42 in accordance with the language. The default height H0 is an example of a reference height. Although the default height H0 is set on the basis of the display language set for the image forming apparatus 10 before shipping from a factory, the default height H0 may be changed in accordance with a change to the display language.

If Japanese is set as the display language, for example, the default height H0 is 16 dots. If the source recording characters include Arabic characters, the area changing section 26 increases the height H of the source recording image area 42 in the height direction by 8 dots, since Arabic requires a height H of 24 dots. The position changing section 30 also moves transmission target image data in the height direction by 8 dots.

If Arabic is set as the display language, on the other hand, the default height H0 is 24 dots. Since the height H of the source recording image area 42 need not be changed even if the source recording characters include Arabic characters, the area changing section 26 does not change the height H of the source recording image area 42. The position changing section 30 does not move transmission target image data, either.

If the source recording characters include only characters in a language that only requires a height smaller than the default height H0, the area changing section 26 may decrease the height H of the source recording image area 42 by a difference between the default height H0 and the required height. For example, when the default height H0 is 24 dots and the source recording characters include only Japanese characters, the area changing section 26 decreases the height H of the source recording image area 42 by 8 dots.

In this case, the position changing section 30 may move transmission target image data toward the source recording image area 42 by 8 dots.

Figure 16:
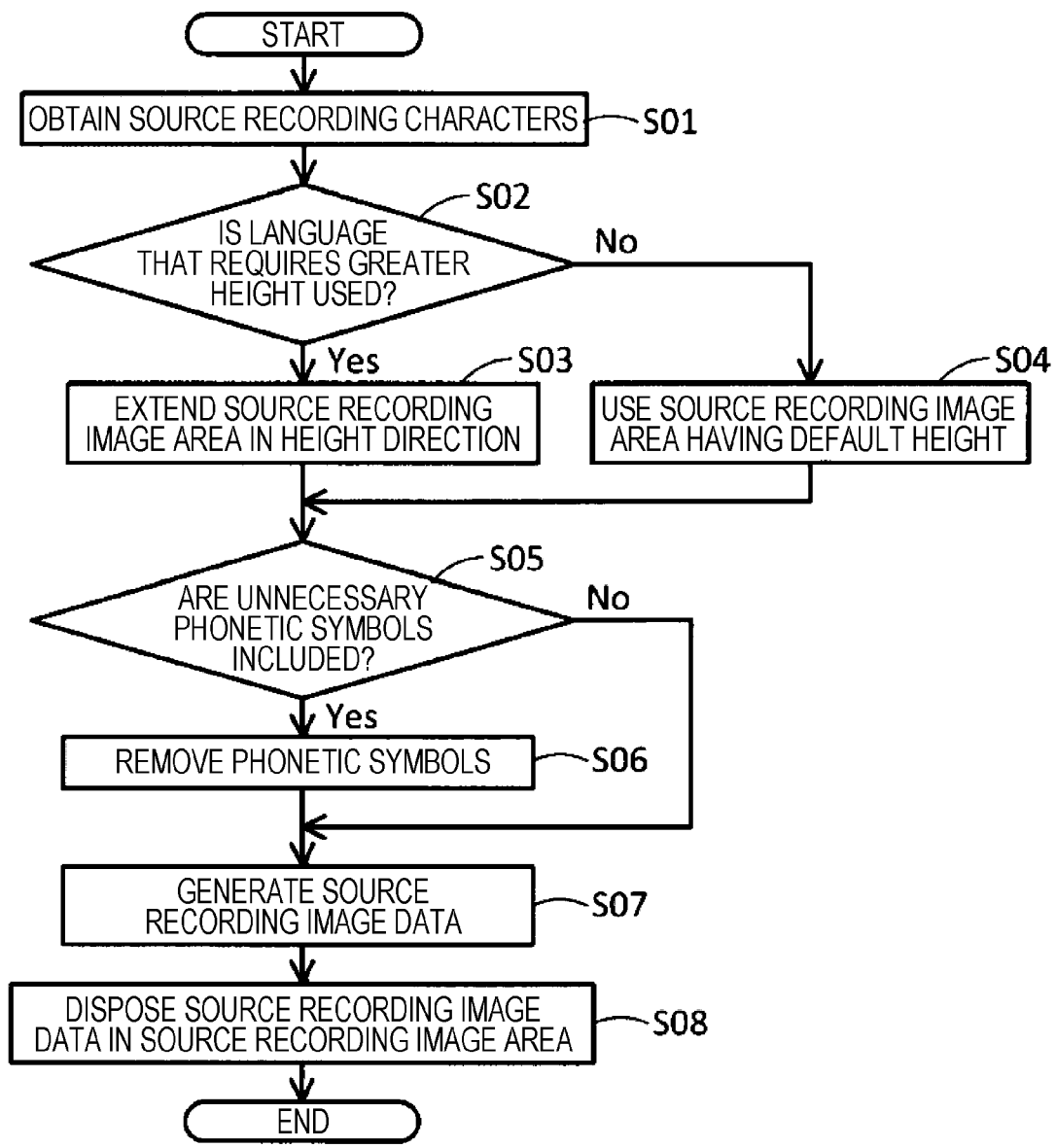
FIG. 16 is a flowchart illustrating a process performed by the image forming apparatus.

A process performed by the image forming apparatus 10 will be described hereinafter with reference to FIG. 16. FIG. 16 is a flowchart illustrating the process. Here, a process based on a result of comparison between the default height H0 of the source recording image area 42 and a height required by a language of source recording characters will be described as an example of the process performed by the image forming apparatus 10.

The area changing section 26 obtains source recording characters to be printed in the source recording area 48 of the sheet 44 (S01).

If the source recording characters include characters in a language that requires a height greater than the default height H0 of the source recording image area 42 (YES in S02), the area changing section 26 extends the source recording image area 42 to the height required by the language (S03).

If the source recording characters do not include characters in a language that requires a height greater than the default height H0 of the source recording image area 42 (NO in S02), the size of the source recording image area 42 is not changed, and the source recording image area 42 having the default height H0 is used (S04).

If the source recording characters include unnecessary phonetic symbols such as tashkil (YES in S05), the removal section 28 removes the unnecessary phonetic symbols from the source recording characters (S06). If the source recording characters do not include unnecessary phonetic symbols (NO in S05), the process proceeds to step S07.

Next, the image generation section 32 generates source recording image data indicating the source recording characters (S07). If the unnecessary phonetic symbols have been removed in step S06, source recording image data indicating the source recording characters from which the unnecessary phonetic symbols have been removed is generated.

Next, the facsimile data generation unit 34 disposes the source recording image data in the source recording image area 42 (S08). As a result, facsimile data is generated.

A comparative example will be described hereinafter with reference to FIG. 17. FIG. 17 illustrates the structure of facsimile data in the comparative example. In the comparative example, the height H of the source recording image area 42 remains the same regardless of the display language set for the image forming apparatus 10. Similarly, the height of the source recording image area 42 remains the same regardless of a language of source recording characters. For example, the height H of the source recording image area 42 in the comparative example is the height H1, which is 16 dots. If the source recording characters include Arabic characters, which require 24 dots in the height direction, in this case, source recording image data indicating the source recording characters is reduced by 8 dots, for example, in order to represent the source recording characters with 16 dots. As a result, the source recording characters might become unidentifiable or blurry, thereby decreasing readability.

Readability improves by changing the height H of the source recording image area 42 in accordance with the display language set for the image forming apparatus 10 or a language of source recording characters, compared to when the height H of the source recording image area 42 remains the same as in the comparative example.

The functions of the components of the image forming apparatus 10 are achieved, for example, by a combination of hardware and software. More specifically, the image forming apparatus 10 includes one or a plurality of processors such as central processing units (CPUs), which are not illustrated. The functions of the components of the image forming apparatus 10 are achieved by reading and executing a program stored in a storage device, which is not illustrated, using the one or plurality of processors. The program is stored in the storage device via a storage medium such as a compact disc (CD) or a digital versatile disc (DVD) or a communication path such as a network. In another example, the functions of the components of the image forming apparatus 10 may be achieved by a hardware resource such as a processor, an electronic circuit, or an application-specific integrated circuit (ASIC). A device such as a memory may be used for this purpose. In yet another example, the functions of the components of the image forming apparatus 10 may be achieved by a digital signal processor (DSP), a field-programmable gate array (FPGA), or the like.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a transmission unit that performs facsimile transmission to a destination; and
   a changing unit that changes, in accordance with a language registered in the information processing apparatus, size of a certain area, in which characters including source characters for identifying a facsimile source are to be formed, of a sheet output at the destination as a result of the facsimile transmission in a height direction of the characters.

2. The information processing apparatus according to claim 1,
   wherein the changing unit changes the size of the certain area in the height direction of the characters in accordance with a display language set for the information processing apparatus.

3. The information processing apparatus according to claim 1,
   wherein the changing unit changes the size of the certain area in the height direction of the characters in accordance with a language of one of the characters.

4. The information processing apparatus according to claim 2,
   wherein the changing unit changes the size of the certain area in the height direction of the characters in accordance with a language of one of the characters.

5. The information processing apparatus according to claim 3,
   wherein the changing unit changes the size of the certain area in the height direction of the characters in accordance with a language of a character that requires a greatest height among languages of the characters.

6. The information processing apparatus according to claim 4, wherein the changing unit changes the size of the certain area in the height direction of the characters in accordance with a language of a character that requires a greatest height among languages of the characters.

7. The information processing apparatus according to claim 3, further comprising:
a removal unit that removes, from each of the characters, a part irrelevant to identification of a meaning of the character,
wherein the changing unit changes the size of the certain area in the height direction of the characters in accordance with the size of each of the characters from which the part has been removed.

8. The information processing apparatus according to claim 4, further comprising:
a removal unit that removes, from each of the characters, a part irrelevant to identification of a meaning of the character,
wherein the changing unit changes the size of the certain area in the height direction of the characters in accordance with the size of each of the characters from which the part has been removed.

9. The information processing apparatus according to claim 5, further comprising:
a removal unit that removes, from each of the characters, a part irrelevant to identification of a meaning of the character,
wherein the changing unit changes the size of the certain area in the height direction of the characters in accordance with the size of each of the characters from which the part has been removed.

10. The information processing apparatus according to claim 6, further comprising:
a removal unit that removes, from each of the characters, a part irrelevant to identification of a meaning of the character,
wherein the changing unit changes the size of the certain area in the height direction of the characters in accordance with the size of each of the characters from which the part has been removed.

11. The information processing apparatus according to claim 1, further comprising:
a display control unit that displays, on a display unit, a recommended value of the size of the certain area in the height direction of the characters in accordance with a language of the characters registered by the user.

12. The information processing apparatus according to claim 2, further comprising:
a display control unit that displays, on a display unit, a recommended value of the size of the certain area in the height direction of the characters in accordance with a language of the characters registered by the user.

13. The information processing apparatus according to claim 3, further comprising:
a display control unit that displays, on a display unit, a recommended value of the size of the certain area in the height direction of the characters in accordance with a language of the characters registered by the user.

14. The information processing apparatus according to claim 4, further comprising:
a display control unit that displays, on a display unit, a recommended value of the size of the certain area in the height direction of the characters in accordance with a language of the characters registered by the user.

15. The information processing apparatus according to claim 5, further comprising:
a display control unit that displays, on a display unit, a recommended value of the size of the certain area in the height direction of the characters in accordance with a language of the characters registered by the user.

16. The information processing apparatus according to claim 6, further comprising:
a display control unit that displays, on a display unit, a recommended value of the size of the certain area in the height direction of the characters in accordance with a language of the characters registered by the user.

17. The information processing apparatus according to claim 1, further comprising:
a position changing unit that changes, in the height direction of the characters in accordance with the size of the certain area, a position on the sheet at which an image transmitted to the destination as a result of the facsimile transmission is to be formed and at which an image other than the characters is to be formed.

18. The information processing apparatus according to claim 2,
wherein the changing unit sets a reference height as the size of the certain area in accordance with the display language set for the information processing apparatus and changes, if the characters include a character in a language that requires a height greater than the reference height, the size of the certain area in the height direction of the characters in accordance with the language that requires the height greater than the reference height.

19. A non-transitory computer readable medium storing a program causing a computer provided for an apparatus that performs facsimile transmission to execute a process, the process comprising:
performing the facsimile transmission to a destination; and
changing, in accordance with a language registered in the apparatus, size of a certain area, in which characters including source characters for identifying a facsimile source are to be formed, of a sheet output at the destination as a result of the facsimile transmission in a height direction of the characters.

* * * * *